United States Patent Office.

FREDERICK WILCOX, OF WATERBURY, ASSIGNOR TO H. B. WILCOX, OF PORTLAND, CONNECTICUT.

Letters Patent No. 96,525, dated November 2, 1869; antedated October 29, 1869.

IMPROVED PROCESS OF UTILIZING THE WASTE FORMED IN CLEANING COPPER AND BRASS GOODS.

The Schedule referred to in these Letters Patent and making part of the same.

*To all whom it may concern:*

Be it known that I, FREDERICK WILCOX, of Waterbury, in the county of New Haven, and State of Connecticut, have invented a new Process for Utilizing the Waste Formed in the Cleaning of Copper and Brass Goods; and I do hereby declare the following to be a full, clear, and exact description of the same.

In the manufacture of articles from brass and copper, they are cleaned by the application of sulphuric and other acids thereto, which remove or cut away a portion of the copper or brass, which has heretofore been entirely wasted.

The object of my invention is to save the copper and acid from the waste thus formed; and to enable others skilled in the art to understand and employ my process, I will proceed to fully describe the same.

The acid, after its action upon the copper or brass goods, passes into pots, in which, after standing awhile, forms a sediment at the bottom, and this sediment is, each day, taken from the pots, and deposited in a suitable vessel, (earthenware preferred,) and the excess of acid rising to the top is drained off, leaving a blue deposit in the vessel.

This blue deposit is next dissolved, through the aid of steam, in any suitable receptacle, and, while in solution, iron of any kind, (the thinner the better, in order that more surface for the same weight may be exposed,) is put into the receptacle containing the dissolved blue deposit, and galvanic action immediately takes place between the blue solution and the iron, causing the precipitation of the copper and corresponding solution of the iron by the acids. This action is allowed to continue till the solution shall have become nearly or quite white or transparent, and gives no trace of copper in the solution. The liquor is then drawn away by a siphon or other suitable means, and strained to free it from any dirt or foreign substance which may be therein. This liquid is then allowed to evaporate and crystallize in any suitable receptacle, a shallow pan being the best suited to the purpose. The first tubs or receptacles are again charged with a new solution of blue deposit, and the process continued until the iron shall have been entirely taken into solution, then the copper may be removed, and more iron placed in the solution. In this process, the acids, which have taken up the iron, evaporated and crystallized, form the valuable commercial product, sulphate of iron, or copperas.

The copper taken from the solution may be thoroughly washed with a dilute solution of sulphuric acid, to remove any traces of iron, then fused and cast into ingots of chemically pure copper.

Thus, what has heretofore been entirely wasted is utilized, affording, as a compensation, a product in value many times the cost of production.

Having fully described my invention,

What I claim as new and useful, and desire to secure by Letters Patent, is—

The process, herein described, of utilizing the waste formed from cleaning copper and brass.

FRED. WILCOX.

Witnesses:
   JOHN O'NEILL, Jr.,
   ALFRED NORTH.